Nov. 23, 1926. 1,607,689
H. S. RAND
GATE
Filed Oct. 4, 1922 2 Sheets-Sheet 1
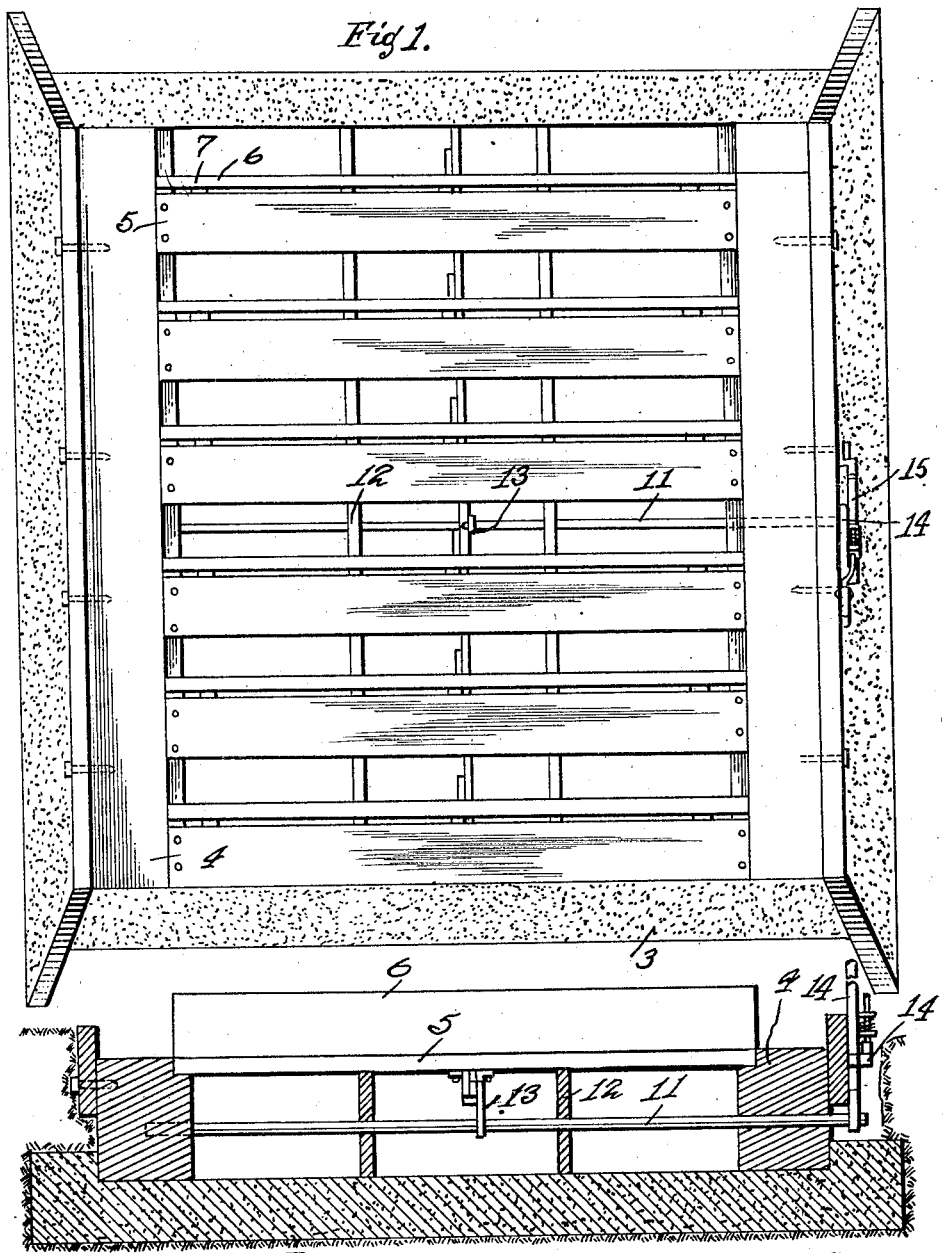

Nov. 23, 1926.
H. S. RAND
GATE
Filed Oct. 4, 1922  2 Sheets-Sheet 2
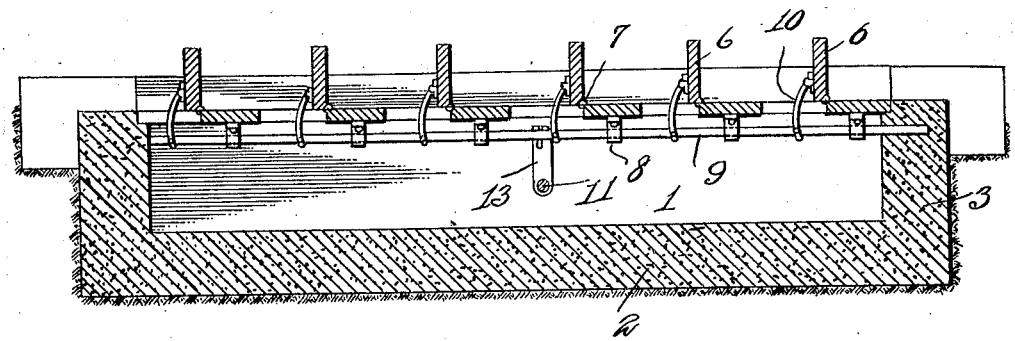
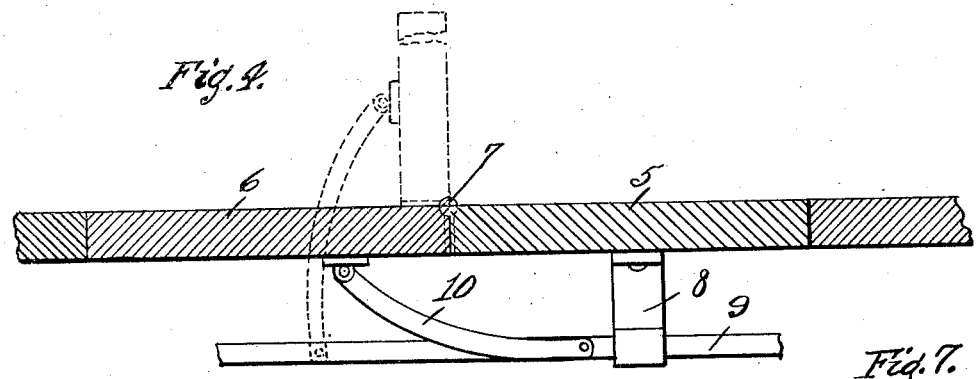
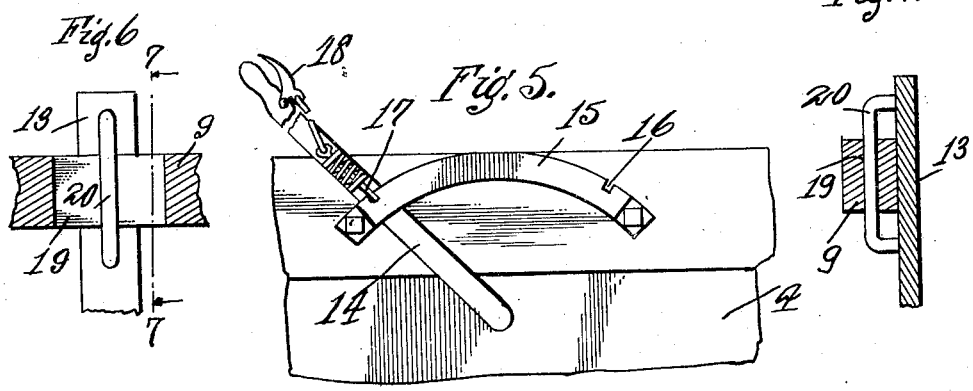
Inventor
Homer S. Rand
Witnesses
By Richard B. Owen.
Attorney Patented Nov. 23, 1926.

1,607,689

UNITED STATES PATENT OFFICE.

HOMER S. RAND, OF PLAINVILLE, KANSAS.

GATE.

Application filed October 4, 1922. Serial No. 592,310.

The present invention relates to a gate or bridge which may be regulated so as to prevent cattle from passing thereover but at all times allowing the passage of vehicles such as automobiles thereover.

Another important object of the invention is to construct a device of this nature which will be simple and efficient, reliable in operation, inexpensive to manufacture, durable, and well adapted to the purpose for which it is designed.

With the above and numerous other objects in view as will appear as the description progresses, the invention resides in certain novel features of construction, and the combination and arrangement of parts as will be hereinafter more fully described and claimed.

In the drawings:—

Figure 1 is a top plan of the structure embodying my invention,

Figure 2 is a transverse section taken therethrough,

Figure 3 is a longitudinal section taken therethrough,

Figure 4 is a detailed longitudinal section on an enlarged scale taken therethrough, Figure 5 is a detailed view showing the controlling crank for the device, Figure 6 is a detailed enlarged section showing the manner in which the operated crank is connected to the operating bar, and Figure 7 is a detailed section taken substantially on the line 7—7 of Figure 6 looking in the direction of the arrow.

Referring to the drawings in detail it will be seen that a pit 1 is provided with the bottom 2 having the end walls 3 and side walls 4. These side walls 4 on their upper surface form a smooth runway for the wheels of an automobile or any other vehicle. A plurality of planks are spanned between the side walls 4 and include the plurality of fixed planks 5 and the hinged planks 6 which are alternately arranged. The hinged planks 6 are hinged to the fixed planks 5 as at 7. When the hinged planks 6 are in a closed position as is illustrated in Figure 4 cattle may readily pass thereover but when they are in a raised or open position as illustrated in the other figures of the drawings, the cattle are prevented from crossing, but this raised position of the planks 6 will not interfere with the passage of an automobile over the gate or bridge.

A bracket 8 depends from the underside of each fixed plank 5 and in these brackets 8 there is slidably mounted an operating bar 9. A curved link 10 connects each hinged plank 6 with the operating bar 9.

A shaft 11 is journalled through one of the side walls 4 and in the longitudinally extending braces 12. Intermediate the end of this shaft 11 there is disposed a crank 13 which I will designate as the operating crank and at the outer end of the shaft there is positioned an operating crank 14 which is associated with the guide bar 15 having adjacent its extremities the notches 16 for receiving the spring pressed dog 17 controlled by the lever 18 on the crank 14. The movement of the operating crank 14 controls the open and closed position of the hinged planks 6 through the intermediacy of the shaft 11, operated crank 13, operating bar 9 and links 10. The operating bar 9 is provided with a slot 19 which receives a bar 20 fixed at its ends to the operated crank 13 as is illustrated to advantage in Figures 6 and 7 whereby the oscillatory motion imparted to the crank 13 will impart a reciprocating motion to the bar 9.

Although I have described my invention with some degree of particularity, it is to be understood that the present embodiment relates merely to the preferred example of the invention and that numerous changes in the details of construction and in the combination and arrangement of parts may be resorted to without departing from the spirit of the invention as hereinafter claimed.

Having thus described my invention what I claim as new is:—

A cattle guard comprising a base structure forming a pit having side and end walls and a bottom wall, a plurality of longitudinally extending spaced vertically disposed braces arranged within the said pit, a plurality of spaced panels rigidly secured to and extending between the side walls, a plurality of hinged panels each of which being hinged to one of the fixed panels, a bracket depending from each of the fixed panels, an operating bar slidably mounted within the said brackets and the said end walls, a plurality of links pivoted to said bar and each of the links having one end pivotally connected with the pivoted panels, a crank shaft journaled within the said braces and the side walls of the pit, and means for operating the said crank shaft.

In testimony whereof I affix my signature.

HOMER S. RAND.